(12) United States Patent
Gribben

(10) Patent No.: US 12,209,001 B2
(45) Date of Patent: Jan. 28, 2025

(54) SELECTIVELY ENABLING FASTER REVERSE DRIVING OF A MATERIALS-HANDLING VEHICLE

(71) Applicant: Hyster-Yale Group, Inc., Fairview, OR (US)

(72) Inventor: John Gribben, Newry (GB)

(73) Assignee: Hyster-Yale Materials Handling, Inc., Fairview, OR (US)

( * ) Notice: Subject to any disclaimer, the term of this patent is extended or adjusted under 35 U.S.C. 154(b) by 84 days.

(21) Appl. No.: 17/560,877

(22) Filed: Dec. 23, 2021

(65) Prior Publication Data
US 2023/0202818 A1 Jun. 29, 2023

(51) Int. Cl.
*B66F 17/00* (2006.01)
*B60W 30/18* (2012.01)

(52) U.S. Cl.
CPC ..... *B66F 17/003* (2013.01); *B60W 30/18036* (2013.01)

(58) Field of Classification Search
CPC .......... B66F 17/003; B60W 30/18036
See application file for complete search history.

(56) References Cited

U.S. PATENT DOCUMENTS

| | | | |
|---|---|---|---|
| 5,346,035 A | 9/1994 | Ueda et al. | |
| 8,392,049 B2 | 3/2013 | Goodwin et al. | |
| 9,561,944 B2 | 2/2017 | Mehaffey et al. | |
| 2005/0023070 A1* | 2/2005 | Smiley | B66F 9/20 180/321 |
| 2006/0061122 A1* | 3/2006 | Billger | B60N 2/797 296/65.07 |
| 2009/0222167 A1* | 9/2009 | Goodwin | B62D 6/00 701/1 |
| 2015/0142278 A1* | 5/2015 | Mehaffey | B66F 9/0759 187/222 |
| 2017/0372188 A1* | 12/2017 | Simon | G07C 9/38 |
| 2018/0229989 A1* | 8/2018 | Goshima | B66F 17/003 |

FOREIGN PATENT DOCUMENTS

| | | | |
|---|---|---|---|
| EP | 1481944 A2 * | 12/2004 | ............ B60K 20/02 |
| EP | 2268534 A1 | 1/2011 | |
| EP | 2540657 B1 | 9/2013 | |
| JP | 2014043327 A * | 3/2014 | |

OTHER PUBLICATIONS

European Search Report, EPO Patent Appl. No. 22172219.2-1017 (Oct. 20, 2022).

* cited by examiner

*Primary Examiner* — Khoi H Tran
*Assistant Examiner* — Tristan J Greiner

(57) ABSTRACT

A method controls the reverse speed of a materials-handling vehicle having a forward-facing operator seat, a front end, a back end, a reverse-consent sensor, and a controller. The method detects, via the reverse-consent sensor, whether an operator of the vehicle is in a position to view a path of the vehicle when the vehicle is driven in a reverse direction; limits, via the controller, the reverse speed of the vehicle to a first maximum reverse speed when the operator is not detected to be in such a position when the vehicle is driven in a reverse direction; and limits, via the controller, the reverse speed of the vehicle to a second maximum reverse speed when the operator is detected to be in such a position. The first maximum reverse speed of the vehicle may be lower than the second maximum reverse speed of the vehicle.

20 Claims, 11 Drawing Sheets

SELECTIVELY ENABLING FASTER REVERSE DRIVING OF A MATERIALS-HANDLING VEHICLE

TECHNICAL FIELD

The field of this disclosure relates generally to materials-handling vehicles. More specifically, this disclosure relates to methods of controlling the reverse speed of a materials-handling vehicle using a reverse-consent sensor to provide the operator use of the materials-handling vehicle's full speed range.

BACKGROUND INFORMATION

Materials-handling vehicles, including lift trucks and tow tugs, are commonly used in manufacturing and warehousing facilities to lift and transport materials. An operator (also referred to as a driver) controls the vehicle from the operator compartment, frequently for multiple hours at a time, moving the vehicle in both the forward and reverse directions.

Certain types of materials-handling vehicles are designed to be driven by a seated operator and are equipped with a forward-facing seat. While seated and driving the vehicle in the forward direction, the operator can generally see any obstacles that lay in the forward path of the vehicle and maneuver around such obstacles or stop the vehicle prior to contact with an obstacle, to avoid damaging the obstacle and/or the vehicle. When seated and driving in reverse, however, the vehicle operator generally should physically turn toward the rear of the vehicle while in the seat and look over a shoulder to see, and subsequently avoid, any obstacles in the vehicle's reverse path. At the same time the operator is turning to look backward, the operator's body may also be maintaining contact with a throttle, such as a foot pedal. Such a body position may be uncomfortable when held for prolonged or repeated periods. In the absence of ergonomic driving control systems, operator comfort and productivity may suffer.

OVERVIEW OF DISCLOSURE

Various multifunctional materials-handling vehicles are designed to be operated when the driver is seated and facing toward the front end of the vehicle, allowing the operator to readily view the vehicle's forward path. Some vehicles equipped with a forward-facing seat may be routinely driven in a reverse direction when carrying loads that block the operator's view of the forward path of the vehicle. When driving in reverse, a seated operator generally has to turn around to manually view, over a shoulder, the rear path of the vehicle. The operator may simultaneously be depressing a foot pedal or rotating a hand throttle to move the vehicle. It is desirable to have a handle for an operator to grasp that is ergonomically positioned to encourage the vehicle operator to turn toward the back end of the vehicle and comfortably view the path of the vehicle while the vehicle travels in reverse.

Materials-handling vehicles generally have three gears, those being forward, neutral, and reverse. The speed of the vehicle when it travels in the forward and reverse directions may be controlled by a speed control system, which may include a throttle. The speed control system may be connected to a systems controller, also referred to as a vehicle system manager (VSM). The speed control system and/or VSM can control the vehicle's maximum allowed reverse speed, such as by lowering it as compared to the maximum reverse speed the vehicle is physically capable of, for example, to reduce potential damage if the vehicle inadvertently contacts an obstacle in its path. The maximum reverse speed may be limited, or be further limited, when the vehicle is being used in specific environments, such as inside a warehouse. When an operator is physically in a position to view the reverse path of the vehicle, however, it may be beneficial to remove any limitation on the vehicle's reverse speed in order to provide the operator access to the vehicle's full reverse speed range.

A reverse-consent sensor that removes any or all reverse speed limitations can be part of an ergonomically designed and positioned handle that is easily grasped by a hand of the vehicle's operator to allow the operator to comfortably turn backward and view the reverse path of the vehicle. Such a reverse-consent sensor can include, for example, a reverse-consent button or reverse-consent lever or other actuator that is attached to or adjacent to the handle, and that is readily accessible when the operator's hand grasps the handle. When the vehicle is placed into the reverse gear, the VSM may send a command signal to the speed control system that limits the maximum reverse speed of the vehicle. Upon activation of the reverse-consent button or reverse-consent lever, which is in communication with the VSM and the vehicle's speed control system, the vehicle operator can signal the VSM to permit the maximum reverse speed to be accessed. The vehicle's maximum reverse speed can be accessed while the reverse-consent button, lever, or other actuator is activated and, upon release of the button, lever, or other actuator by the operator, the vehicle returns to the lowered or limited maximum reverse speed.

The reverse-consent sensor may be integrated into, or adjacent to, a handle located on the vehicle. The handle may be positioned such that the vehicle operator's hand, when grasping the handle, indicates that the operator is following operator training instructions. For example, the operator's hand grasping the handle may activate a reverse-consent sensor and thereby indicate that the operator is in a position to view the reverse direction of the vehicle. In one embodiment, the reverse-consent sensor includes an electrical impedance switch, photocell, or a pressure switch that is integrated into or near the handle and that is activated when the operator's hand grasps the handle. In an embodiment, the operator may press a button, move a lever, or otherwise actuate an actuator adjacent to the handle using the same hand that grasps the handle, to activate the reverse-consent sensor. In an alternative embodiment, the reverse-consent sensor includes a camera that detects whether the head of the vehicle operator is turned in a direction that looks toward the reverse path of the vehicle.

One aspect of this disclosure relates to a method of controlling the reverse speed of a materials-handling vehicle. These methods incorporate a reverse-consent sensor that allows the operator of the vehicle to access the full reverse speed range of the vehicle when the operator is detected to be in a position to view the reverse path of the vehicle.

In an embodiment, a method of controlling the reverse speed of a materials-handling vehicle having a forward-facing operator seat, a front end, a back end, a reverse-consent sensor, and a controller, includes the steps of detecting, via the reverse-consent sensor, whether an operator of the vehicle is in a position to view a path of the vehicle when the vehicle is driven in a reverse direction; limiting, via the controller, the reverse speed of the vehicle to a first maximum reverse speed when the operator is not detected to be in a position to view the path of the vehicle when the vehicle is driven in a reverse direction; and limiting, via the controller, the reverse speed of the vehicle to a second maximum reverse speed when the operator is detected to be in a position to view the path of the vehicle when the vehicle is driven in a reverse direction, wherein the first maximum reverse speed of the vehicle is lower than the second maximum reverse speed of the vehicle.

In an additional embodiment, a method of controlling the reverse speed of a materials-handling vehicle having a forward-facing operator seat, a front end, and a back end, includes a means for detecting whether an operator of the vehicle is in a position to view the reverse path of the vehicle and a means for limiting the reverse speed of the vehicle to a first maximum reverse speed when the operator is not detected to be in a position to view the reverse path of the vehicle and to a second maximum reverse speed when the operator is detected to be in a position to view the reverse path of the vehicle, wherein the first maximum reverse speed of the vehicle is lower than the second maximum reverse speed of the vehicle.

One will appreciate, however, that methods of controlling the reverse speed of a materials-handling vehicle using other advantageous steps described herein are also possible.

One aspect of this disclosure relates to materials-handling vehicles that incorporate a handle, with the handle shape and placement designed to provide a driver with ergonomic and productive vehicle operation. The handle can be located to one side of, or behind, the operator, in an ergonomic position such that the vehicle operator can easily grasp the handle and turn toward the back end of the vehicle to comfortably view the path of the vehicle while the vehicle travels in reverse. This can be achieved by designing the operator compartment to include ready access to the handle on, for example, a portion of the vehicle's overhead guard or on a rear panel behind the operator seat. When grasping the handle, a seated operator can turn toward the rear of the vehicle to view the vehicle's reverse path without incurring undue neck, back, or leg strain. Use of the handle can reinforce operator training and indicate proper operator performance.

An aspect of this disclosure relates to materials-handling vehicles that incorporate a handle and a reverse-consent sensor. The reverse-consent sensor may be designed and positioned to be readily activated by a seated operator when the operator grasps the handle and is in a position to view the vehicle's reverse path.

An aspect of this disclosure relates to materials-handling vehicles that employ a reverse-consent sensor that can determine whether the operator is physically positioned to look at the reverse path of the vehicle while the materials-handling vehicle travels in reverse gear. In an embodiment, the reverse-consent sensor is able to determine if the vehicle operator is grasping the handle with a hand. In an additional embodiment, the reverse-consent sensor is able to determine if the operator's head is turned toward the rear end of the vehicle. The materials-handling vehicle can have a first maximum reverse speed when the reverse-consent sensor is not activated, such as when the reverse-consent sensor does not detect a hand present on the handle, and can have a second maximum reverse speed when the reverse-consent sensor is activated, such as when the reverse-consent sensor detects a hand present on the handle. The first maximum reverse speed may be lower than the second maximum reverse speed.

The materials-handling vehicles may further include a horn button that emits an audible alert when depressed. In an embodiment, the horn button is placed on or adjacent to the handle such that it can be readily pressed by the operator's thumb when the operator grasps the grip portion of the handle.

In an embodiment, a materials-handling vehicle comprises a vehicle body having a front end and a back end, a plurality of wheels, a forward-facing operator seat and a throttle, a reverse-consent sensor, and a controller operably connected to the reverse-consent sensor and the throttle. The controller may limit the materials-handling vehicle to a first maximum reverse speed when the reverse-consent sensor does not detect that the operator is in a position to view the reverse path of the vehicle. The controller may limit the materials-handling vehicle to a second maximum reverse speed when the reverse-consent sensor detects that the operator is in a position to view the reverse path of the vehicle. The first maximum reverse speed may be lower than the second maximum reverse speed.

In some embodiments, a materials-handling vehicle comprises multiple wheels which include one or more drive wheels and one or more steer wheels, a forward-facing operator seat in an operator compartment, a throttle which accelerates the vehicle, one or more energy sources, one or more reverse-consent sensors configured to detect whether an operator of the vehicle is in a position to view the reverse path of the vehicle, a vehicle body having a front side, a rear side, a left side, and a right side, and a controller adapted for operable connection to one or more of the drive wheels, one or more reverse-consent sensors, and/or the throttle, and wherein the controller is adapted for limiting the maximum reverse speed of the vehicle.

In an additional embodiment, the materials-handling vehicle includes a vehicle body having a front end and a back end, a plurality of wheels, a forward-facing operator seat, a throttle, a mast, at least two forks, an overhead guard, a handle having a grip portion, a reverse-consent sensor comprising a button, and a controller operably connected to the reverse-consent sensor and the throttle. Activation of the button may signal that the operator is in a position to view the reverse path of the vehicle, and the reverse-consent sensor may detect the button activation. The controller may limit the materials-handling vehicle to a first maximum reverse speed when the reverse-consent sensor does not detect that the operator is in a position to view the reverse path of the vehicle. The controller may limit the materials-handling vehicle to a second maximum reverse speed when the reverse-consent sensor detects that the operator is in a position to view the reverse path of the vehicle and the reverse-consent sensor is engaged. The first maximum reverse speed can be lower than the second maximum reverse speed. The controller may be additionally configured to include a delay of about 3-5 seconds before changing from the second maximum reverse speed of the materials-handling vehicle to the first maximum reverse speed when the reverse-consent sensor does not detect that the operator is in a position to view the reverse path of the vehicle. The controller may be additionally configured to limit the forward speed of the vehicle when the reverse-consent sensor detects that the operator is in a position to view the reverse path of the vehicle and the vehicle is placed in a forward gear. The controller may be additionally configured to enable a lift interlock system when the reverse-consent sensor detects that the operator is in a position to view the reverse path of the vehicle.

In some additional, alternative, or selectively cumulative embodiments, the method enables a lift interlock system when the reverse-consent sensor detects that an operator is in a position to view the reverse path of the vehicle.

In some additional, alternative, or selectively cumulative embodiments, the method returns the reverse speed of the vehicle to the first maximum reverse speed when the reverse-consent sensor no longer detects an operator to be in a position to view the reverse path of the vehicle.

In some additional, alternative, or selectively cumulative embodiments, the method delays by about 3-5 seconds limiting the reverse speed of the vehicle to the first maximum reverse speed when the reverse-consent sensor no longer detects an operator to be in a position to view the reverse path of the vehicle.

In some additional, alternative, or selectively cumulative embodiments, the method limits the reverse speed of the vehicle to the maximum reverse speed of which the vehicle is physically capable.

In some additional, alternative, or selectively cumulative embodiments, the method limits the forward speed of the vehicle when the vehicle is placed into a forward gear and the reverse-consent sensor indicates that the operator is in position to view the reverse path of the vehicle.

In some additional, alternative, or selectively cumulative embodiments, the method limits the forward speed of the vehicle when the operator is detected to be in a position to view the path of the vehicle when the vehicle is driven in a reverse direction.

In some additional, alternative, or selectively cumulative embodiments, the materials-handling vehicle employs a reverse-consent sensor that is configured to detect whether an operator of the vehicle is in a position to view the reverse path of the vehicle.

In some additional, alternative, or selectively cumulative embodiments, the materials-handling vehicle employs a reverse-consent sensor that is configured to detect whether a hand of the operator of the vehicle is grasping a handle.

In some additional, alternative, or selectively cumulative embodiments, the materials-handling vehicle is a lift truck.

In some additional, alternative, or selectively cumulative embodiments, the materials-handling vehicle includes a horn button.

In some additional, alternative, or selectively cumulative embodiments, the materials-handling vehicle includes a handle comprising a grip portion and a reverse-consent sensor that is configured to sense whether a hand of the operator is grasping the grip portion of the handle.

In some additional, alternative, or selectively cumulative embodiments, the materials-handling vehicle employs a reverse-consent sensor that is at least one of a camera, photocell, button, lever, pressure switch, or electrical impedance switch.

In some additional, alternative, or selectively cumulative embodiments, the materials-handling vehicle employs a controller that includes a processor.

In some additional, alternative, or selectively cumulative embodiments, the materials-handling vehicle includes a mast that is operably connected to a lift interlock system that locks the mast in place when the lift interlock system is engaged, at least two forks, and a controller that is configured to engage the lift interlock system when the reverse-consent sensor detects the operator is in a position to view the reverse path of the vehicle.

In some additional, alternative, or selectively cumulative embodiments, the materials-handling vehicle includes an overhead guard having at least two support legs, and the materials-handling vehicle employs a handle located on a support leg of the overhead guard.

In some additional, alternative, or selectively cumulative embodiments, the materials-handling vehicle employs a handle located between the operator seat and the back end of the vehicle body.

In some additional, alternative, or selectively cumulative embodiments, the materials-handling vehicle includes a rear panel behind the operator seat, and the materials-handling vehicle employs a handle located on the rear panel behind the operator seat.

In some additional, alternative, or selectively cumulative embodiments, the method for controlling the reverse speed of a materials-handling vehicle employs a means for detecting whether an operator of the vehicle is in a position to view the reverse path of the vehicle.

In some additional, alternative, or selectively cumulative embodiments, the method for controlling the reverse speed of a materials-handling vehicle employs a means for detecting whether a hand of the operator of the vehicle is grasping a handle.

In some additional, alternative, or selectively cumulative embodiments, the method for controlling the reverse speed of a materials-handling vehicle employs a means for detecting whether an operator of the vehicle is in a position to view the reverse path of the vehicle that includes a reverse-consent sensor. Said means may comprise a reverse-consent sensor that is at least one of a camera, photocell, button, lever, pressure switch, electrical impedance switch, or equivalents thereof known to those skilled in the art.

In some additional, alternative, or selectively cumulative embodiments, the method for controlling the reverse speed of a materials-handling vehicle employs a means for limiting the reverse speed of the vehicle to a first maximum reverse speed when the operator is not detected to be in a position to view the reverse path of the vehicle and to a second maximum reverse speed when the operator is detected to be in a position to view the reverse path of the vehicle. Said means may include a controller including a processor.

In some additional, alternative, or selectively cumulative embodiments, the method for controlling the reverse speed of a materials-handling vehicle employs a means for lifting for a load and a means for disabling the means for lifting a load when the operator is detected to be in a position to view the reverse path of the vehicle.

Additional aspects and advantages will be apparent from the following detailed description of example embodiments, which proceeds with reference to the accompanying drawings.

DETAILED DESCRIPTION OF EMBODIMENTS

Figure 1:
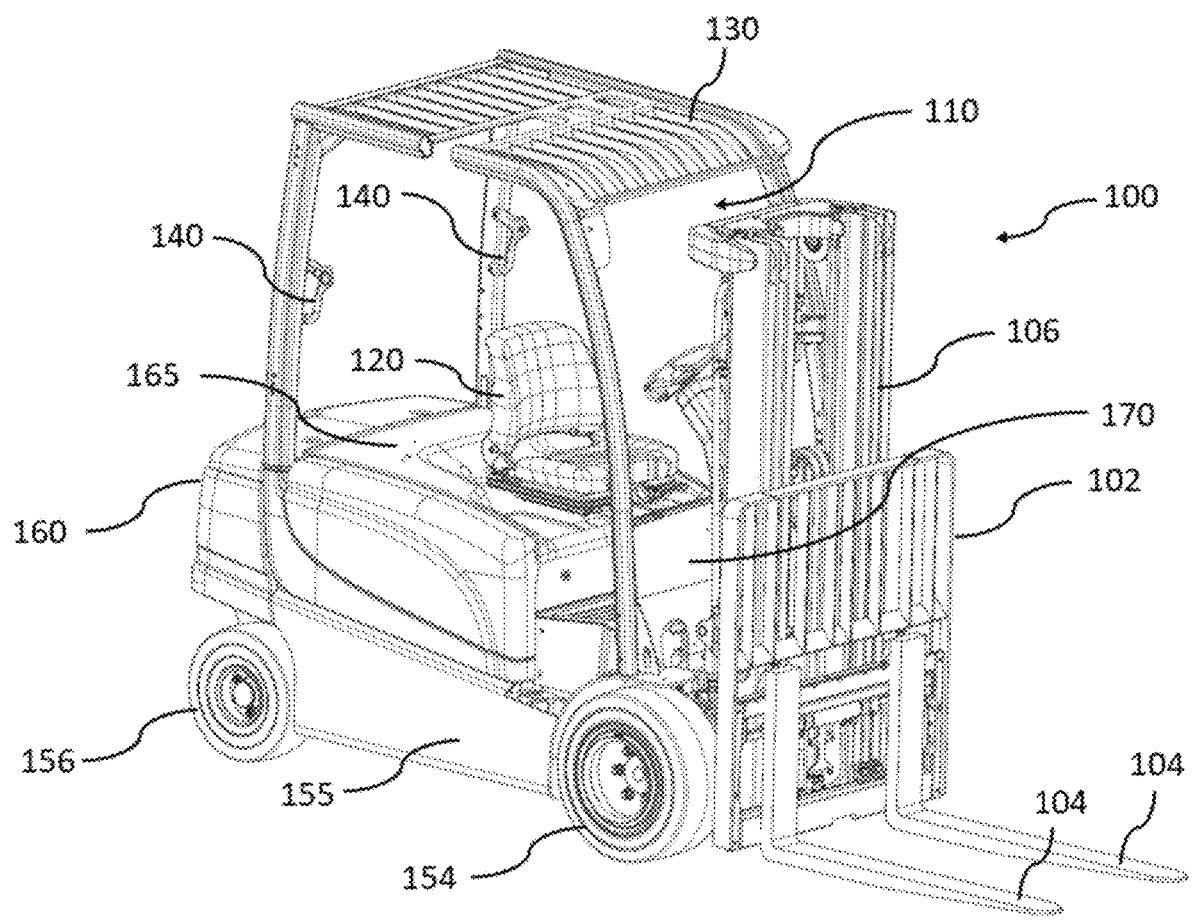
FIG. 1 is an isometric drawing of a materials-handling vehicle having a reverse-consent sensor from a front right perspective, according to one embodiment.

Example embodiments are described below with reference to the above-listed drawings. The terminology used herein is for the purpose of describing particular example embodiments only and is not intended to be limiting. As used herein, the singular forms "a," "an" and "the" are intended to include the plural forms as well, unless the context clearly indicates otherwise. It should be recognized that the terms "comprise," "comprises," "comprising," "include," "includes," "including," "has," "have," and "having," when used in this document, specify the presence of stated features, integers, steps, operations, elements, and/or components, but do not preclude the presence or addition of one or more other features, integers, steps, operations, elements, components, and/or groups thereof.

Unless otherwise expressly stated, the sizes, positions, etc., of components, features, elements, etc., as well as any distances therebetween, are not necessarily to scale, and may be disproportionate and/or exaggerated for clarity. Unless indicated otherwise, the terms "about," "thereabout," "substantially," "approximately," etc. mean that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In certain embodiments, the terms "about," "substantially," and "approximately," refer to values that are, for example, within 1% of the stated value, within 2% of the stated value, within 3% of the stated value, within 4% of the stated value, within 5% of the stated value, within 6% of the stated value, within 7% of the stated value, within 8% of the stated value, within 9% of the stated value, within 10% of the stated value, within 11% of the stated value, within 12% of the stated value, within 13% of the stated value, within 14% of the stated value, or within 15% of the stated value. In an embodiment, the terms "about," "substantially," and "approximately," refer to values that are within 10% of the stated value.

Unless otherwise specified, a range of values, when recited, includes both the upper and lower limits of the range, as well as any sub-ranges therebetween. Unless indicated otherwise, terms such as "first," "second," etc., are only used to distinguish one element from another and not to imply any relative order, placement, or ranking. For example, one element could be termed a "first element" and similarly, another element could be termed a "second element," or vice versa. The section headings used herein are for organizational purposes only and are not to be construed as limiting the subject matter described.

Spatially relative terms, such as "right," left," "below," "beneath," "lower," "above," and "upper," and the like, may be used herein for ease of description to describe one element's or feature's relationship to another element or feature, as illustrated in the drawings. It should be recognized that the spatially relative terms are intended to encompass different orientations in addition to the orientation depicted in the drawings. For example, if an object in the figures is turned over, elements described as "below" or "beneath" other elements or features would then be oriented "above" the other elements or features. Thus, the term "below" can, for example, encompass both an orientation of above and below. An object may be otherwise oriented (e.g., rotated 90 degrees or at other orientations) and the spatially relative descriptors used herein may be interpreted accordingly.

Unless clearly indicated otherwise, all connections and all operative connections may be direct or indirect. Similarly, unless clearly indicated otherwise, all connections and all operative connections may be rigid or non-rigid. For the purposes of the present disclosure, the phrase "A and/or B" means (A), (B), or (A and B). For the purposes of the present disclosure, the phrase "combination of (A) and (B)" means (A), (B), or (A and B). For the purposes of the present disclosure, the phrase "A, B, and/or C" means (A), (B), (C), (A and B), (A and C), (B and C), or (A, B and C).

Like numbers refer to like elements throughout. Thus, the same or similar numbers may be described with reference to other drawings even if they are neither mentioned nor described in the corresponding drawing. Also, even elements that are not denoted by reference numbers may be described with reference to other drawings. Additionally, the drawings may include non-essential elements that are included only for the sake of thoroughness. These non-essential elements may be removed entirely or left only in outline form if drawing changes are desired to create greater clarity.

The embodiments described herein are merely examples, set forth by way of illustration only and not limitation. Those skilled in the art will recognize in light of the teachings herein that there are alternatives, variations and equivalents to the example embodiments described herein and their component parts. For example, other embodiments are readily possible, variations can be made to the embodiments described herein, and there may be equivalents to the components, parts, or steps that make up the described embodiments. For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

As one skilled in the art will appreciate in light of this disclosure, certain embodiments of the reverse-consent sensor for the materials-handling vehicles that are disclosed herein may be capable of achieving certain advantages, including, in some cases, one or more of the following: (1) encouraging an operator to view the reverse path of the vehicle comfortably by grasping an ergonomically located handle; (2) accessing the full speed range of the vehicle in the reverse direction; (3) providing a handle that is comfortable to grasp and easily accessible when the vehicle travels in reverse; (4) providing a handle incorporating a horn button that is easily accessible when the vehicle travels in reverse; (5) reinforcing and/or indicating proper operator training via the operator grasping a handle when the vehicle is driven in reverse; and (6) affording the ability to accommodate right-handed and left-handed operators by having two handles on a vehicle. The foregoing and other advantages of various embodiments will be apparent upon reading this document.

FIGS. 1-4 are front and rear isometric illustrations of a materials-handling vehicle 100 according to one example embodiment. Referring to FIGS. 1-6, the vehicle 100 is a forklift truck that includes a lift carriage 102, two forks 104, a mast 106, and an operator compartment 110 including an operator seat 120. An overhead guard 130 covers the operator compartment 110. The overhead guard 130 can include a handle 140, a reverse-consent button 144, and horn button 148 mounted on a leg of the overhead guard 130. The vehicle body 155 can extend between the back end 160 and front end 170 of the vehicle 100 with respect to an operator seated in the seat 120 in the operator compartment 110, looking in a straight-forward-facing direction toward the mast 106.

The operator seat 120 has a seat bottom upon which the operator is seated, that is approximately parallel to the ground. In an embodiment, the seat bottom of seat 120 has front, left, right and rear edges. The seat 120 may be rotatable about a vertical axis to provide an operator with views behind, to the sides, and in front of the truck by rotating the seat. For example, the operator seat 120 may have a range of rotation of greater than or equal to approximately ±22 degrees from a straight-forward-facing direction, greater than or equal to approximately ±30 degrees from a straight-forward-facing direction, greater than or equal to approximately ±60 degrees from a straight-forward-facing direction, greater than or equal to approximately ±90 degrees from a straight-forward-facing direction, greater than or equal to approximately ±180 degrees from a straight-forward-facing direction, greater than or equal to approximately ±270 degrees from a straight-forward-facing direction, or approximately ±360 degrees from a straight-forward-facing direction.

Depending on the layout of other components in the operator compartment 110 or cost considerations, the operator seat 120 may intentionally be limited to a range of rotation that is less than or equal to approximately ±270 degrees, ±180 degrees, ±90 degrees, ±60 degrees, or ±30 degrees. For example, the operator seat 120 may have a range of rotation of approximately ±15-25 degrees from a forward-facing direction, ±20-25 degrees from a forward-facing direction, or ±18-22 degrees from a forward-facing direction. In one embodiment, the operator seat 120 has a range of rotation of approximately ±22 degrees from a forward-facing direction. One will also appreciate that the range of rotation need not be the same in the clockwise and counterclockwise directions.

The operator seat 120 can be configured to slide backward, sideways, forward, or a combination of such directions, while rotating. The seat 120 can be adjusted vertically, in addition to or instead of the rotation and/or sliding mechanisms. For example, embodiments of the seat 120 can be designed to have the seat bottom be raised and lowered from an initial height between approximately 0.5 and 10 inches (or about 1-26 cm), such as between approximately 1 and 6 inches (or about 2-16 cm), between approximately 2 and 5 inches (or about 5-13 cm), at least approximately 2 inches (5 cm), no more than approximately 5 inches (13 cm), or approximately 4 inches (10 cm). The seat 120 can have one armrest, or it may have two armrests, or it may be free of armrests.

The seat 120 may be attached to the vehicle 100 by a seat bracket (not shown) that extends from the truck body 155 in the posterior portion of the body 155. The operator seat 120 can alternatively be attached to the vehicle 100 by a bracket that extends from the floor of the operator compartment 110, such as a column that is parallel to, or coincident with, a vertical axis of rotation of the seat 120.

For the purposes of the present disclosure, the term "seat" refers to a component within the operator compartment 110 designed for an operator to rest in while operating the vehicle 100. In an embodiment, the seat 120 is designed for a seated operator. In an embodiment, the seat 120 may be omitted, for example, when a vehicle is designed for a standing operator, such as in a stand-up rider vehicle. In certain embodiments, the seat 120 may be attached to the vehicle 100 by a bracket that extends from the back end 160 toward the front end 170 of the vehicle 100 with respect to an operator in the operator compartment 110 sitting in the seat 120, looking in a straight-forward-facing direction toward the mast 106 and/or forks 104.

The materials-handling vehicle 100 can include a roof that employs an overhead guard 130 that extends over the operator compartment 110 to protect the operator from hazards, such as falling materials. In an embodiment, the vehicle 100 can include an overhead guard 130 above the operator compartment 110. The overhead guard 130 may be attached to the vehicle 100 using support legs. In certain embodiments, the overhead guard 130 is solid and opaque, for example, to act as a sun shade to protect the operator from sunlight when the truck is used outside. Alternatively, the overhead guard 130 is transparent or semi-transparent in whole or in part and/or has one or more apertures to enable the operator to view the forks 104, top of the mast 106, and/or its load when the mast 106 is raised. In another embodiment, the overhead guard 130 comprises a sheet of plexiglass over substantially the entire roof area of the overhead guard 130 so as to maximize overhead visibility for the operator.

Figure 2:
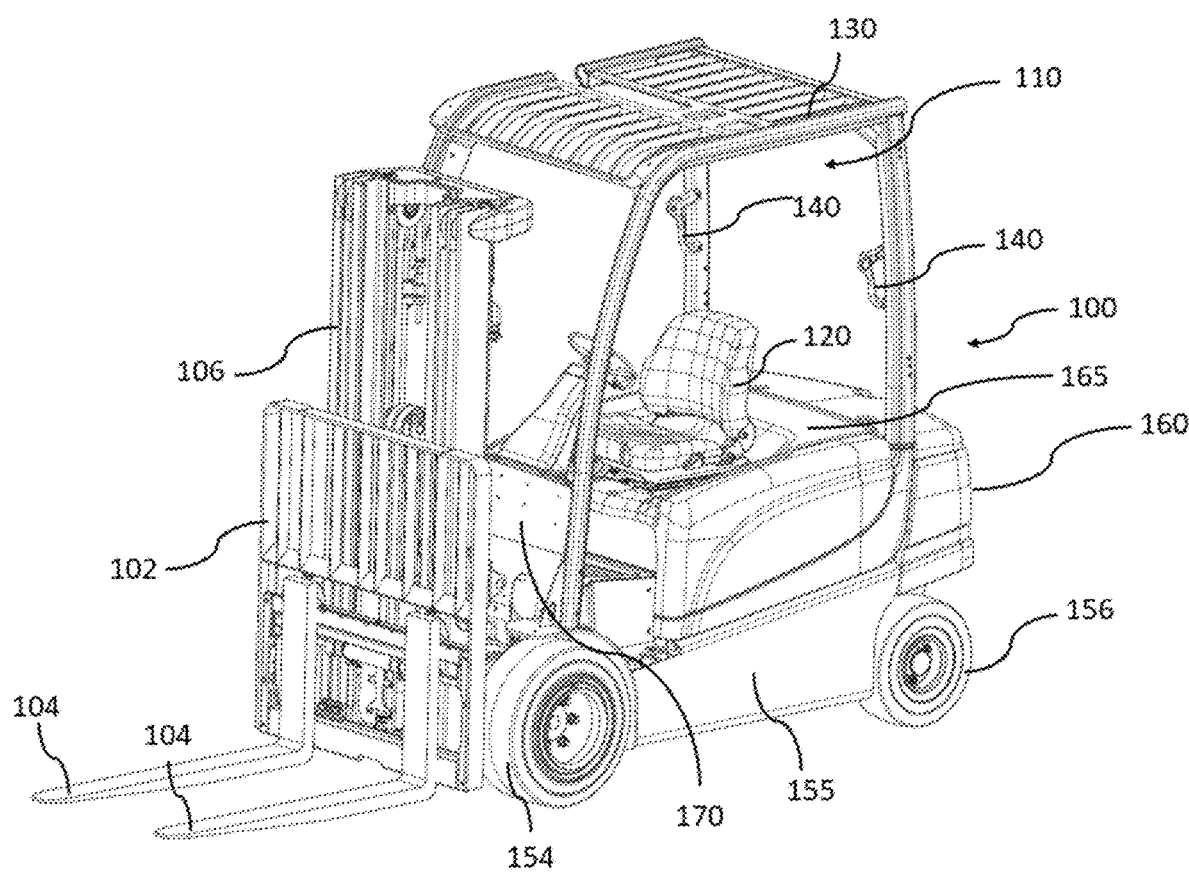
FIG. 2 is an isometric drawing of the vehicle of FIG. 1 from a front left perspective.
Figure 3:
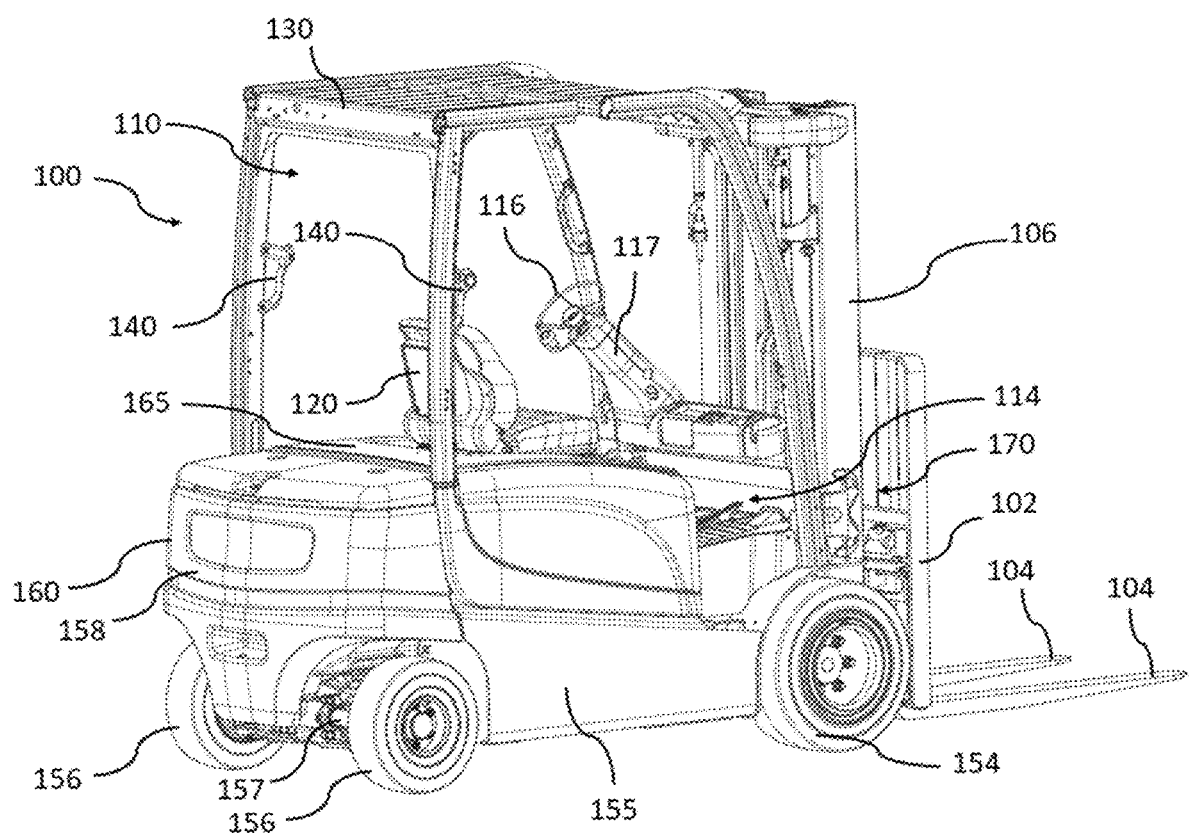
FIG. 3 is an isometric drawing of the vehicle of FIG. 1 from a rear right perspective.
Figure 4:
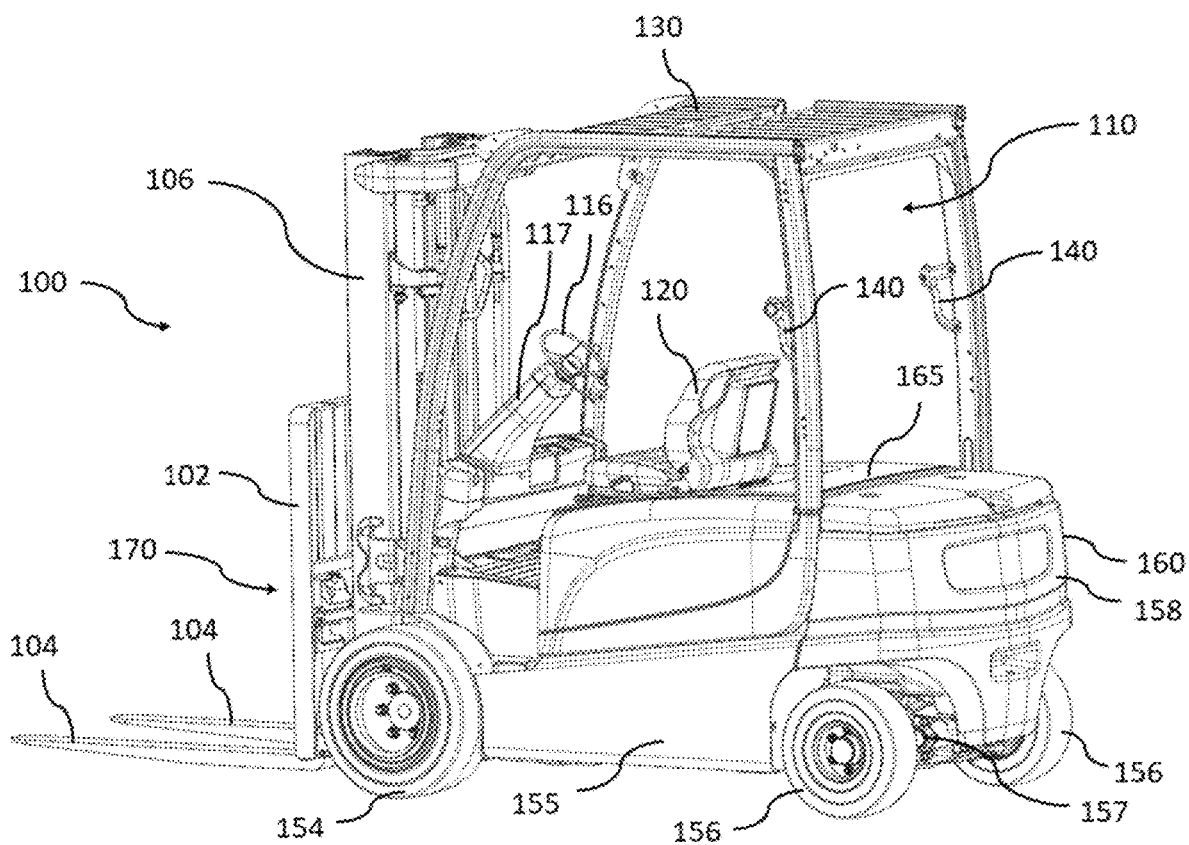
FIG. 4 is an isometric drawing of the lift truck of FIG. 1 from a rear left perspective.

FIGS. 3 and 4 illustrate rear isometric views of the materials-handling vehicle 100 shown in FIGS. 1 and 2. The operator compartment 110 can additionally include means for acceleration, such as a throttle that is a foot control 114, and a steering wheel 116. Foot controls 114 can include a throttle, a brake, and/or an inching pedal. Alternatively, the operator compartment 110 may be free of foot controls, and acceleration of the vehicle 100 is performed by a hand throttle. In an embodiment, vehicle 100 has two front wheels 154 and two rear wheels 156. The steering wheel 116 may be configured to turn the rear wheels 156 when the vehicle 100 moves forward or backward. The steering wheel 116 may be mounted on a steering column 117. In an embodiment, the steering wheel 116 is mounted on a steering column 117 that is attached to the front end 170 of the operator compartment 110.

In an embodiment, there is no steering wheel 116 or steering column 117 present in the operator compartment 110. For example, means for steering can be integrated into the operator seat 120 of the vehicle 100, and the steering controls can comprise a steering bar having a hand throttle, or the steering controls can comprise a hand lever control. The seat 120 can incorporate steering controls, such as by integration of hand-operated operator controls into the seat 120. Such integrated steering controls may be located on an armrest, or on both armrests, of the seat 120. In an embodiment, the means for steering vehicle 100 includes a steering bar having a hand-operated throttle attached to the bar.

The vehicle 100 includes a plurality of wheels, such as two front wheels 154 and two back wheels 156. The wheels 154 and 156 are directly or indirectly attached to the body 155 of the vehicle 100 and are configured to roll to steerably move the vehicle 100 forward and backward. For example, the rear wheels 156 may be attached to a steer axle 157 that is attached to a counterweight 158, which is attached to body 155, and the front wheels 154 may be attached to a drive axle (not shown) that is attached to body 155. All or a subset of the plurality of wheels may be steerable by an operator.

The vehicle 100 generally has two pairs of wheels, as indicated in FIGS. 1-4. Two of the wheels 154 or 156 of the vehicle 100 can independently be replaced with a single wheel to form a materials-handling vehicle having three wheels. For example, the two rear wheels 156 shown in FIG. 3 may be replaced with a single rear wheel. Additional front or rear wheels can independently be added to the vehicle 100 to form a vehicle having more than four wheels. In an embodiment, the vehicle 100 has a plurality of wheels that comprises at least one left wheel and at least one right wheel. In an embodiment, the vehicle 100 has a plurality of wheels that comprises two front wheels and one rear wheel. All or a subset of the wheels may be solid, or all or a subset of the wheels may be pneumatic, or they may include a mixture of solid and pneumatic wheels.

The vehicle 100 may include a rear panel 165 that is located behind the operator seat 120. The panel 165 can be a cover to a rear compartment that lies behind the operator seat 120 and that may contain, for example, power electronics, a vehicle energy source, or other vehicle parts. Because the rear panel 165 is located behind the seat 120, the rear panel 165 can provide an attachment location for a handle 140 on the vehicle 100, as indicated in the embodiment shown in FIG. 7 and described in more detail below.

The materials-handling vehicle 100 incorporates an energy source that stores and/or generates energy for the vehicle 100. The energy from the energy source may be converted to power by a power plant to turn one or more of a plurality of wheels to propel the vehicle forward and backward and to actuate the lift assembly, if present. The energy source used for turning the wheels and propelling the vehicle may be the same as, or may be different from, the energy source used for the lift assembly. The term "energy source" may be used herein to convey one or more of a fuel, a fuel conversion device, a battery, and a battery bank. The power plant may include, but is not limited to, an electric motor, an internal combustion engine, a hydrogen fuel cell, or any combination of the foregoing. For example, the energy source used to propel and steer the vehicle may be a lithium-ion battery or a lead-acid battery or a bank of multiple such batteries, and the lift assembly and/or wheels may be actuated directly or indirectly by an electric motor powered by the one or more batteries. In another embodiment, the energy source is a hydrogen fuel cell that runs an electric motor and/or an electric pump. In certain embodiments, the energy source includes a lithium-ion battery and a hydrogen fuel cell.

In some contexts, "fuel" may refer to electricity, fossil fuel, such as gasoline or diesel, or battery compositions, such as lead-acid or lithium-ion, or hydrogen, such as liquid or gaseous. In some contexts, "power plant" may refer to a fuel cell or a motor or an internal combustion engine or any device that converts energy into physical motion of the vehicle or its hydraulic system. A battery bank of multiple batteries may in some circumstances be considered to be one functional unit that may be referred to herein as simply a "battery." Thus, the term "battery" may mean a single battery or a functional unit comprising multiple batteries, depending on context. The energy source and power plant are in communication with, and may be controlled by, the vehicle system manager.

Figure 5:
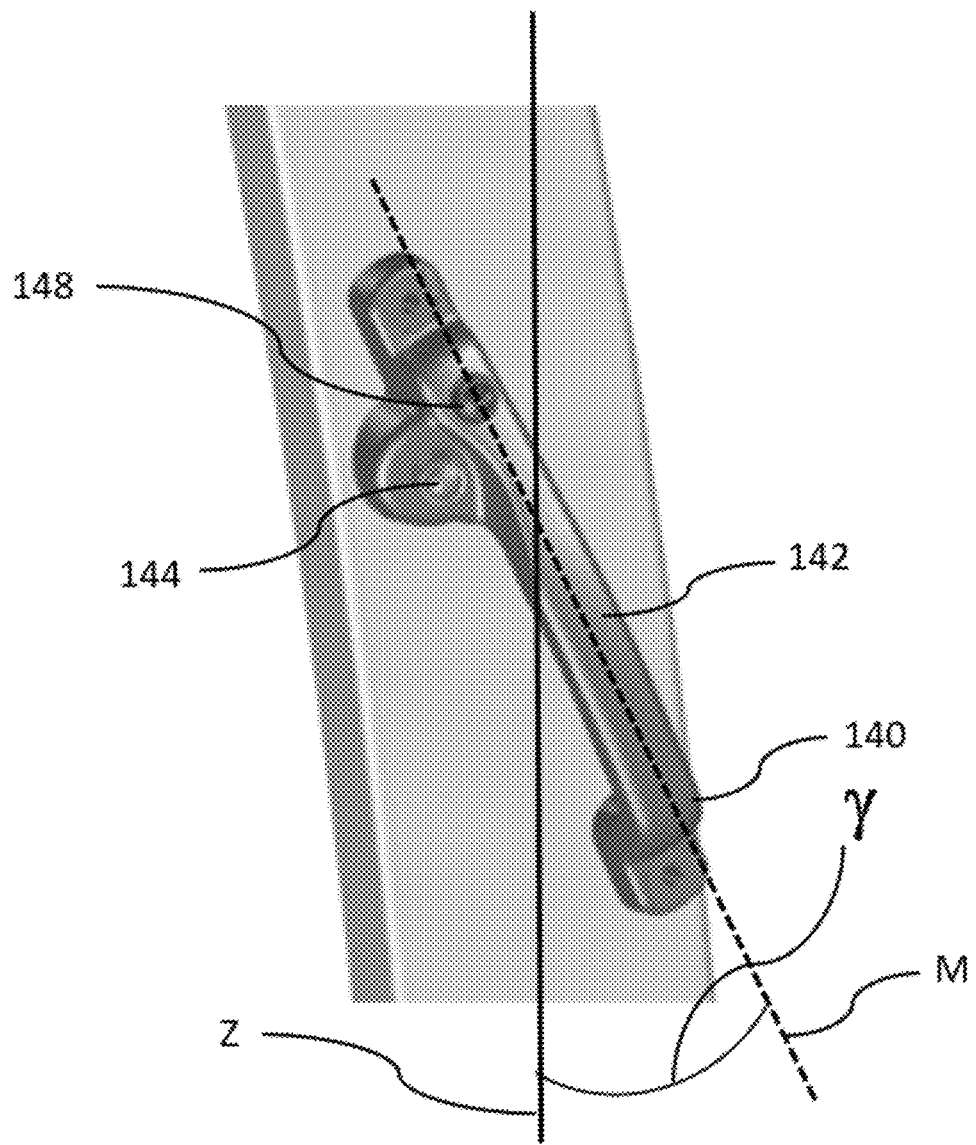
FIG. 5 is a view of the handle of the vehicle shown in FIGS. 1-4.

With reference to FIG. 5, the handle 140 includes a reverse-consent button 144. The handle 140 may further comprise an optional horn button 148. The handle 140 is generally positioned to be ergonomically grasped by a seated operator turning toward the back end 160 of the vehicle 100 to view the path of the vehicle while the vehicle is driven in reverse. Because the operator may turn toward either the right side of the vehicle 100 or the left side of the vehicle 100 to view the reverse path of the vehicle, the vehicle may include two handles 140. In one embodiment, the vehicle 100 comprises one handle 140. In another embodiment, the vehicle 100 comprises two handles 140.

It is understood that the handle 140 is placed on the vehicle 100 in a location and position that is ergonomic with respect to a typical (e.g., "95%," meaning all but the 5% outliers of the population in terms of size and shape) male or female truck operator sitting in seat 120. In an embodiment, the handle 140 is placed on the vehicle 100 in a location that does not require 95% of male or female operators when seated in seat 120 to rotate their torso more than approximately 160 degrees, more than approximately 150 degrees, or more than approximately 140 degrees to either side from a straight-forward-facing direction.

Figure 6:
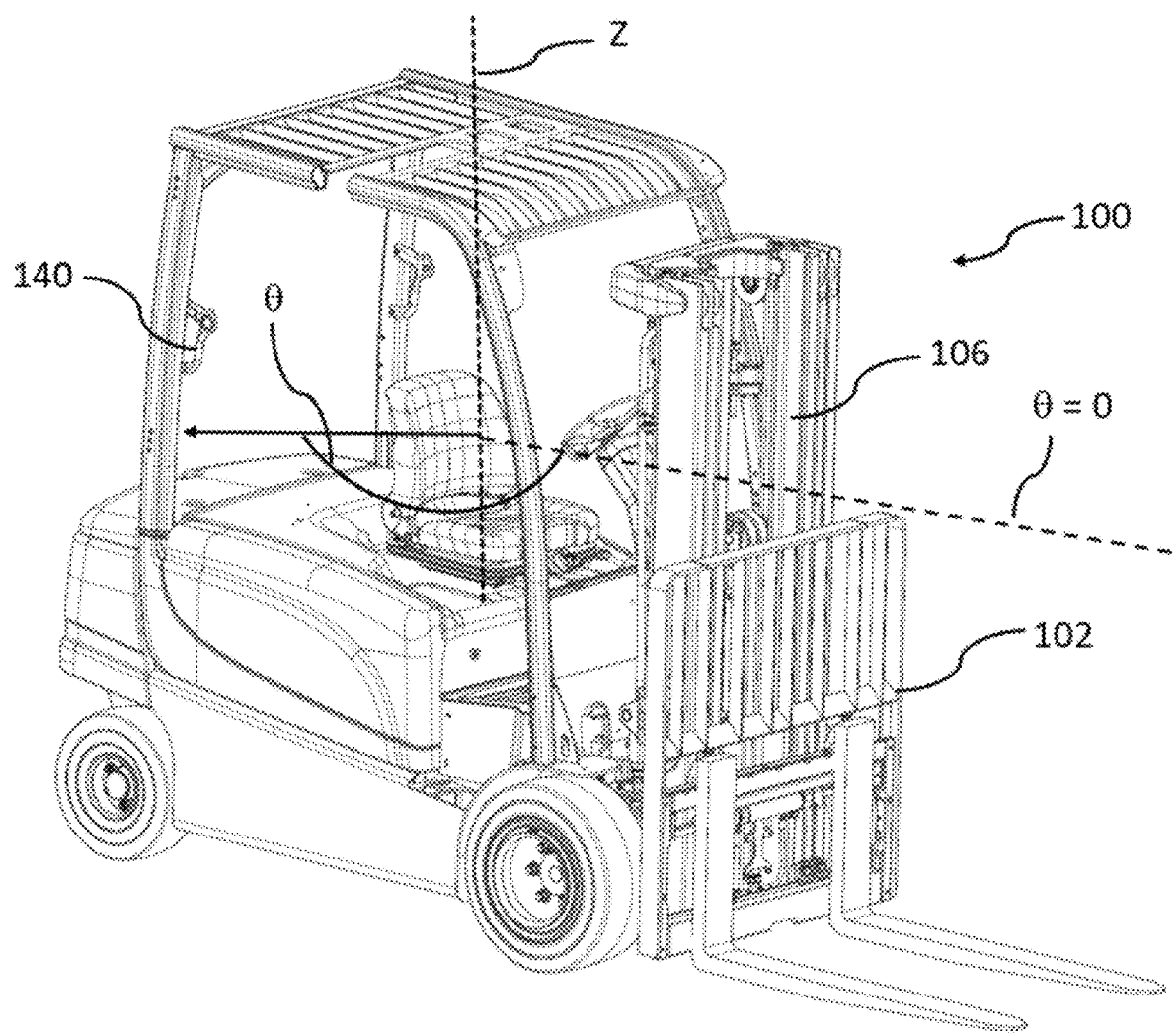
FIG. 6 is an illustration of angle theta for the lift truck of FIG. 1.

The handle 140 may be positioned such that its major axis (M) is angled relative to an approximately vertical axis (Z) that intersects the handle 140 and is perpendicular to the substantially flat surface that the vehicle 100 rests upon. The vertical axis Z is parallel to the vertical axis of rotation of the center of seat 120 of the vehicle 100 described above. The term "major axis" refers to the axis along the longest portion of the handle 140, around which the typical male or female truck operator's hand grasps. The major axis M is illustrated in FIG. 5 for the handle 140 of the vehicle 100. Vertical axes Z are shown in FIGS. 5 and 6, are approximately perpendicular to the substantially flat surface that the vehicle 100 rests upon, and are substantially parallel to the mast 106. The vertical axis of rotation Z of the seat 120 is present even if the seat 120 is not designed to rotate about a central axis.

The handle 140 may be positioned substantially vertically on the vehicle 100 such that its major axis is angled at an angle gamma ($\gamma$) relative to the vertical axis Z, as illustrated in FIG. 5. In an embodiment, the major axis of the handle 140 is within an angle gamma ($\gamma$) of approximately ±20 degrees relative to the vertical axis Z, within an angle $\gamma$ of approximately ±30 degrees relative to the vertical axis Z, within an angle $\gamma$ of approximately ±40 degrees relative to the vertical axis Z, or within an angle $\gamma$ of approximately ±45 degrees relative to the vertical axis Z. In an embodiment, the major axis of the handle 140 is mounted on a leg of the overhead guard 130, the leg being approximately perpendicular to the substantially flat surface that the vehicle 100 rests upon and substantially parallel to the mast 106, within an angle $\gamma$ of approximately ±45 degrees relative to the vertical axis Z. In an embodiment, the major axis of the handle 140 is parallel to the vertical axis Z and the angle gamma ($\gamma$) is zero.

The handle 140 is placed on the vehicle 100 in a location readily accessible by a typical seated operator to ergonomically grasp it when turning toward the back end 160 of the vehicle 100 to view the reverse path of the vehicle 100. With reference to FIG. 6, the handle 140 may be placed on the vehicle 100 at an angle theta ($\theta$) relative to a straight-forward-facing direction, as determined by an operator sitting on the substantially flat surface of the seat 120 having an axis of rotation Z. For this parameter, the handle 140 is considered to be a single point, generally representing the center point (middle) of the length of the handle 140. This angle is illustrated in FIG. 6 for the vehicle 100. The handle 140 may be placed at an angle $\theta$ of approximately ±60 degrees from a straight-forward-facing direction, at an angle $\theta$ of approximately ±90 degrees from a straight-forward-facing direction, at an angle $\theta$ of approximately ±100 degrees from a straight-forward-facing direction, at an angle θ of approximately ±120 degrees from a straight-forward-facing direction, at an angle θ of approximately ±130 degrees from a straight-forward-facing direction, at an angle θ of approximately ±150 degrees from a straight-forward-facing direction, at an angle θ of approximately ±160 degrees from a straight-forward-facing direction, at an angle θ of approximately ±170 degrees from a straight-forward-facing direction, or at an angle θ of approximately ±180 degrees from a straight-forward-facing direction. In one embodiment, the handle 140 is placed at an angle θ of approximately ±120 degrees from a straight-forward-facing direction. In an embodiment, the handle 140 is mounted on a leg of the overhead guard 130, the leg being approximately perpendicular to the substantially flat surface that the vehicle 100 rests upon and substantially parallel to the mast 106, within an angle γ of approximately ±45 degrees relative to the vertical axis Z and is also placed at an angle θ of approximately ±120 degrees from a straight-forward-facing direction.

The handle 140 can be adjusted vertically, that is, along the vertical axis Z, in addition to angle of placement theta (θ) on the vehicle 100 and the angle of its major axis gamma (γ). For example, embodiments of the handle 140 can be placed at a height between approximately 5 and 35 inches (or about 12-89 cm) from the initial height of the base of the seat 120, such as between approximately 10 and 30 inches (or about 25-76 cm), between approximately 15 and 25 inches (or about 38-63 cm), at least approximately 10 inches (25 cm), no more than approximately 40 inches (100 cm), or approximately 20 inches (50 cm). In an embodiment, the handle 140 is mounted on a leg of the overhead guard 130. In an embodiment, the handle 140 is mounted within an enclosed operator cabin of a materials-handling vehicle, such as on the frame of a door or a window.

In certain embodiments, the handle 140 can be placed at a height at or near the initial height of the base of the seat 120, such as within approximately 10 inches (or about 25 cm) from the height of the base of the seat 120, within approximately 5 inches (or about 13 cm), within approximately 3 inches (8 cm), no more than approximately 5 inches (13 cm), or approximately even with the height of the base of the seat 120.

Figure 7:
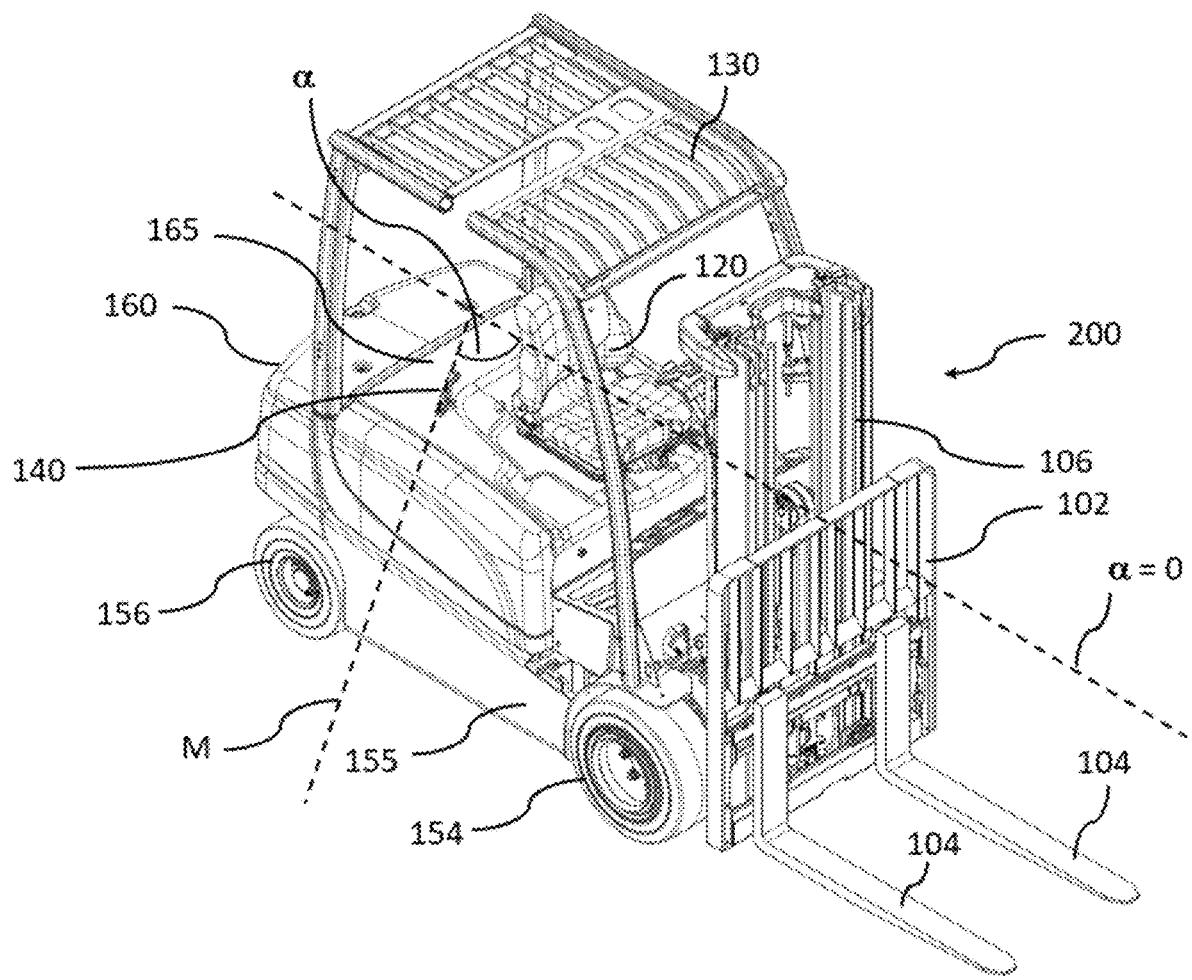
FIG. 7 is a materials-handling vehicle having a reverse-consent sensor, according to an additional embodiment.

In an embodiment, the handle 140 is mounted on the rear panel 165 of vehicle 200, such as shown in FIG. 7. In an embodiment, the rear panel 165 comprises one handle 140. In an embodiment, the rear panel 165 comprises two handles 140.

In certain embodiments, the handle 140 can be mounted on the rear panel 165 behind the seat 120, at a distance between approximately 5 and 35 inches (or about 12-89 cm) from the rear edge of the bottom of seat 120, extending toward the back end 160 of the vehicle 100 or 200. In an embodiment, the handle 140 is positioned at a distance between approximately 10 and 30 inches (or about 25-76 cm), between approximately 15 and 25 inches (or about 38-63 cm), at least approximately 10 inches (25 cm), no more than approximately 40 inches (100 cm), or approximately 20 inches (50 cm), from the rear edge of the bottom of seat 120, extending toward the back end 160 of the vehicle 100 or 200. The handle 140 may be mounted on the rear panel 165 having an angle of placement and an angle of its major axis, as is described herein.

FIG. 7 illustrates an embodiment of a vehicle 200 in which the handle 140 (incorporating a reverse-consent sensor as described elsewhere in this document) is located on the rear panel 165 behind the operator seat 120. The handle 140 is generally positioned to be ergonomically grasped by a typical seated operator turning toward the back end 160 of the vehicle 200 to view the path of the vehicle while the vehicle travels in reverse. In an embodiment, the rear panel 165 comprises one handle 140. In an embodiment, the rear panel 265 comprises two handles 140. In a two-handle configuration, the handles may be symmetrically placed on the left and right sides of the rear panel 165 so that the operator can turn either way to grasp a handle. In these embodiments, the handle 140 is positioned substantially horizontally on a vehicle 200, meaning that the handle 140 is mounted on a substantially horizontal surface, such as the rear panel 165.

As illustrated in FIG. 7, the handle 140 may be positioned substantially horizontally on a vehicle 200, and has its major axis M angled at an angle alpha (α) relative to the straight-forward facing direction, that is, where angle alpha (α)=0. In an embodiment, the major axis M of the handle 140 is within an angle alpha (α) of approximately ±20 degrees relative to the straight-forward facing direction, within an angle α of approximately ±30 degrees relative to the straight-forward facing direction, within an angle α of approximately ±40 degrees relative to the straight-forward facing direction, within an angle α of approximately ±45 degrees relative to the straight-forward facing direction, or within an angle α of approximately ±90 degrees relative to the straight-forward facing direction. In an embodiment, the handle 140 is mounted on rear panel 165 behind the operator seat 120, and is placed with the major axis M of the handle 140 being within an angle alpha (α) of approximately ±45 degrees from a straight-forward-facing direction.

With reference to FIG. 7, the handle 140 may be placed at a height on the vehicle 200 as compared to the ground or floor level when the vehicle 200 lies on a substantially flat surface. For example, embodiments of the handle 140 can be placed at a height between approximately 20 and 200 inches (or about 50-508 cm) from ground level, such as between approximately 50 and 150 inches (or about 127-381 cm), between approximately 75 and 125 inches (or about 190-318 cm), at least approximately 100 inches (254 cm), no more than approximately 200 inches (508 cm), or approximately 50 inches (127 cm).

In an embodiment, the vertical height, angle of placement, and angle of the major axis of handle 140 from ground level and/or from the base of the seat 120 does not require 95% of male or female operators to rotate their body more than approximately 140 degrees, more than approximately 150 degrees, or more than approximately 160 degrees to either the right or left from the straight-forward-facing direction to grasp the handle 140.

The reverse-consent button 144, as illustrated in FIG. 5, is designed and located to be readily and easily engaged by the operator when the operator is in a position to view the reverse path of the vehicle 100. For example, the reverse-consent button 144 is accessible by the operator's thumb when the operator grasps the handle 140.

Figure 8:
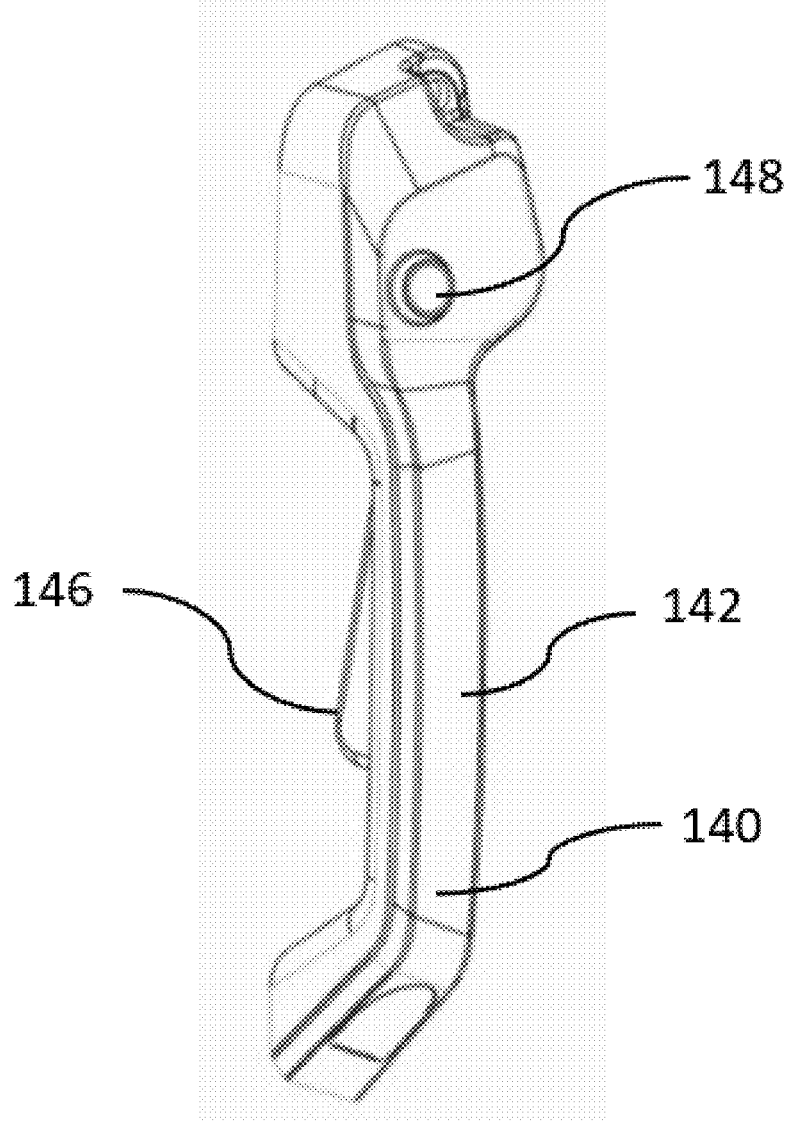
FIG. 8 is a view of an additional embodiment of a reverse-consent sensor.

The handle 140 can include a grip portion 142, as illustrated in FIGS. 5 and 8, for an operator seated in the seat 120 to grasp with a hand when driving the vehicle 100. A reverse-consent squeeze lever 146 may be attached to or nearby the handle 140, as illustrated in FIG. 8. The reverse-consent squeeze lever 146 may be configured to detect when an operator seated in seat 120 is grasping the grip portion 142 of a handle 140 on a vehicle 100, such as when the vehicle is moving in the reverse direction. In an embodiment, the reverse-consent squeeze lever 146 is integrated into the handle 140, particularly into the grip portion 142. The reverse-consent squeeze lever 146 may be configured to detect when an operator seated in seat 120 is in a position to view the path of the vehicle 100 when the vehicle is moving in the reverse direction. The operator's hand can grasp the grip portion 142 of handle 140 and activate the reverse-consent squeeze lever 146 by squeezing their fingers to thereby pull the lever toward the grip portion 142. The reverse-consent squeeze lever 146 can be embedded into, or coaxial with, the grip portion 142, and a horn button 148 may be positioned, for example, near an end of the grip portion 142 for easy access by the operator's thumb.

Figure 9:
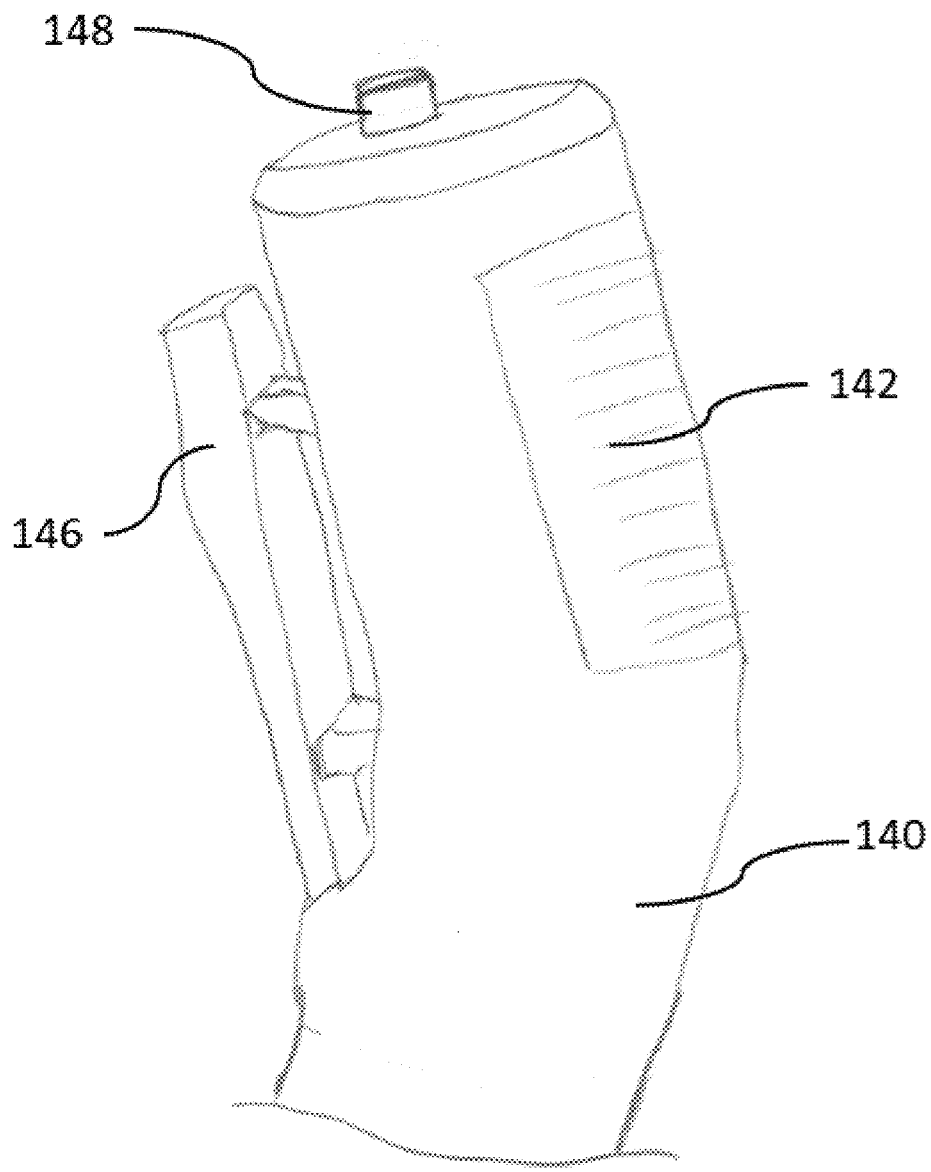
FIG. 9 is a view of an additional embodiment of a reverse-consent sensor.

FIG. 9 illustrates an alternative embodiment wherein the handle 140 is a joystick-type handle including a grip portion 142 and a reverse-consent squeeze lever 146. The operator's hand can grasp the grip portion 142 of handle 140 and activate the reverse-consent squeeze lever 146 by squeezing their fingers to thereby pull the squeeze lever 146 toward the grip portion 142. The reverse-consent squeeze lever 146 can be embedded into, or coaxial with, the grip portion 142, and an optional horn button 148 may be positioned, for example, at the top of the grip portion 162 for easy access by the operator's thumb.

The reverse-consent button 144 (FIG. 5) and the reverse-consent squeeze lever 146 (FIGS. 8 and 9) are examples of reverse-consent sensors. Specifically, the reverse-consent button 144 and the reverse-consent squeeze lever 146 are examples of reverse-consent sensors in the form of mechanical movement-based switches actuated by the operator's hand, fingers, or thumb. Other mechanical-based mechanisms can also be used as the reverse-consent sensor, including, for example, toggle switches, press switches, slide switches, etc. Alternatively, the reverse-consent sensor may be implemented in the form of a solid-state touch sensor, such as a photocell, pressure switch, electrical impedance switch, or capacitive, resistive, or inductive skin-contact or body-proximity sensor. The reverse-consent sensor may detect, for example, a thermal or light signal, such as by using visible, ultraviolet, or infrared light; pressure; weight; or a change in electrical impedance; or any combination of thereof. As used herein, the term "sensor" in regard to a reverse-consent sensor refers to any device that can be actuated—with or without direct physical touch—by either mechanical, electrical, optical, electromagnetic, or thermal means or a combination of one or more of the foregoing means.

For example, the handle 140 can include a reverse-consent sensor 145 that is a photocell attached to the grip portion 142. The photocell can be located on the handle 140 and configured such that it detects when the operator's hand is placed on the grip portion 142. In an embodiment, the reverse-consent sensor 145 may be a photocell that is placed adjacent to the handle 140 and that is configured to detect an operator's hand placed on the grip portion 142. The reverse-consent sensor 145 may be an electrical impedance switch that is embedded into the grip portion 142 of the handle 140 and that is configured to detect when an operator's hand is grasping the grip portion 142. The reverse-consent sensor 145 may be a pressure switch that is embedded into the grip portion 142 of the handle 140, and that is configured to detect when an operator's hand is grasping the grip portion 142.

In certain embodiments, the reverse-consent sensor 145 is not incorporated into the handle 140. For example, the reverse-consent sensor 145 may comprise a camera that is placed, for example, on or near the overhead guard 140 and that is directed at the operator's head. The camera may be configured to detect when the operator's head is turned toward the back end 160 of the vehicle 100, thereby indicating that the operator is in a position to view the reverse path of the vehicle 100. The reverse-consent sensor 145 may comprise LIDAR or radar.

In an embodiment, the reverse-consent sensor 145 includes at least one of a camera, photocell, button, lever, actuator pressure switch, and an electrical impedance switch. In an embodiment, the reverse-consent sensor 145 is a camera, photocell, button, lever, actuator, pressure switch, or electrical impedance switch. The reverse-consent sensor 145 may include multiple detection devices, such as a thermal camera combined with an electrical impedance switch.

Figure 10:
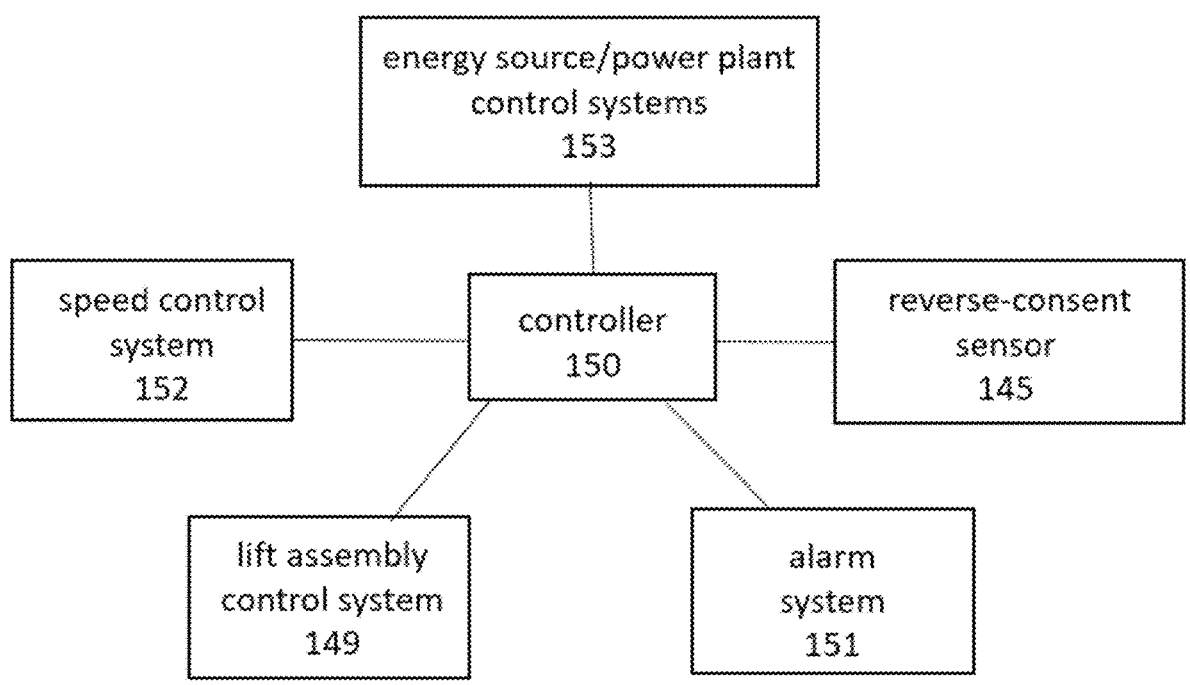
FIG. 10 is a simplified block diagram illustrating example control systems for a materials-handling vehicle equipped with a reverse-consent sensor.

FIG. 10 is a simplified block diagram illustrating how a reverse-consent sensor 145 may be configured to communicate electronically with one or more of the control systems of the vehicle 100, such as a speed control system 152, an alarm system 151, a lift assembly control system 149 (if present), and a power plant and/or energy source control system 153, through a controller 150 which may comprise a VSM. The reverse-consent sensor 145 could be any one of the reverse-consent button 144, reverse-consent squeeze lever 146, any of the other options identified herein, or other suitable option. In an embodiment, the reverse-consent sensor 145 is operably connected to the speed control system 152 of the vehicle 100 via the controller 150. The reverse-consent sensor 145 can inform the controller 150 whether an operator is in a position to view the path of the vehicle 100 when the vehicle is moving in the reverse direction, and the controller 150 may be configured to enable or disable certain of the vehicle's control systems and/or some or all of their functionality based on a signal from the reverse-consent sensor 145. The alarm system 151 may include one or more audible or visual signals, or both an audible and a visual signal.

According to one example embodiment, the controller 150 is a logic device configured for electronic communication with multiple control systems of the vehicle 100, including one or more of the reverse-consent sensor 145, the speed control system 152, the alarm system 151, any vehicle-specific control systems such as a lift assembly control system 149 in forklift trucks, and the power control system 153. The controller 150 may be a general-purpose microprocessor, special-purpose processor, digital signal processor (DSP), embedded controller, or the like programmed in full or in part by software or firmware, which may be stored on a removable or permanent computer-readable medium, including, for example, memory integrated circuits (e.g., RAM, ROM, EPROM, EEPROM), magnetic discs, or optical discs. Alternatively, the controller 150 may be implemented in fixed or semi-fixed logic integrated into one or several devices, include one or more application specific integrated circuits (ASICs), field-programmable gate arrays (FPGA), programmable logic arrays (PLAs), etc. In one embodiment, the controller 150 comprises a processor. In another embodiment, the controller 150 is a processor.

A materials-handling vehicle 100 may have a maximum reverse speed that is reduced as compared to its maximum forward speed. The maximum reverse speed may be additionally or alternatively limited when the vehicle is present in specific environments, such in a warehouse. For example, the vehicle 100 may have a maximum forward speed of about 20 kph and a maximum reverse speed of about 15 kph, but the maximum reverse speed may be further reduced to about 10 kph when the vehicle 100 is indoors in a warehouse.

One or more of the limits on the maximum reverse speed of a materials-handling vehicle 100 may be removed by the controller 150 when the operator is in a position to view the reverse path of the vehicle as detected by the reverse-consent sensor 145. Thus, when the reverse-consent sensor 145 informs the controller 150 that an operator is in a position to view the path of the vehicle 100 when the vehicle is moving in the reverse direction, the controller 150 can remove any or all of the limitations on the maximum reverse speed of the vehicle 100 to allow the operator access to the vehicle's full speed range.

In an embodiment, the vehicle 100 includes a reverse-consent sensor 145 in the form of a reverse-consent button 144 or reverse-content squeeze lever 146 on or associated with a handle 140 having a grip portion 142, and a horn button 148. A typical operator seated in seat 120 can place the vehicle 100 into the reverse gear, grasp ergonomic handle 140 along the grip portion 142, and turn toward the back end 160 of the vehicle 100 to view the reverse path of the vehicle 100. In the reverse gear, the controller 150 may limit the maximum reverse speed of the vehicle to a speed that is less than the maximum reverse speed. During or after turning toward the back end 160 of the vehicle 100, the operator can actuate the reverse-consent sensor 145 and thereby indicate that the operator is positioned to view the reverse path of the vehicle 100. The controller 150 detects the signal from the reverse-consent sensor 145 and allows the full range (and not just a slower subset) of the reverse speed of the vehicle 100 to be accessible to the operator. The operator can then accelerate the vehicle using, for example, a foot pedal throttle, while actuating the reverse-consent sensor 145.

Figure 11:
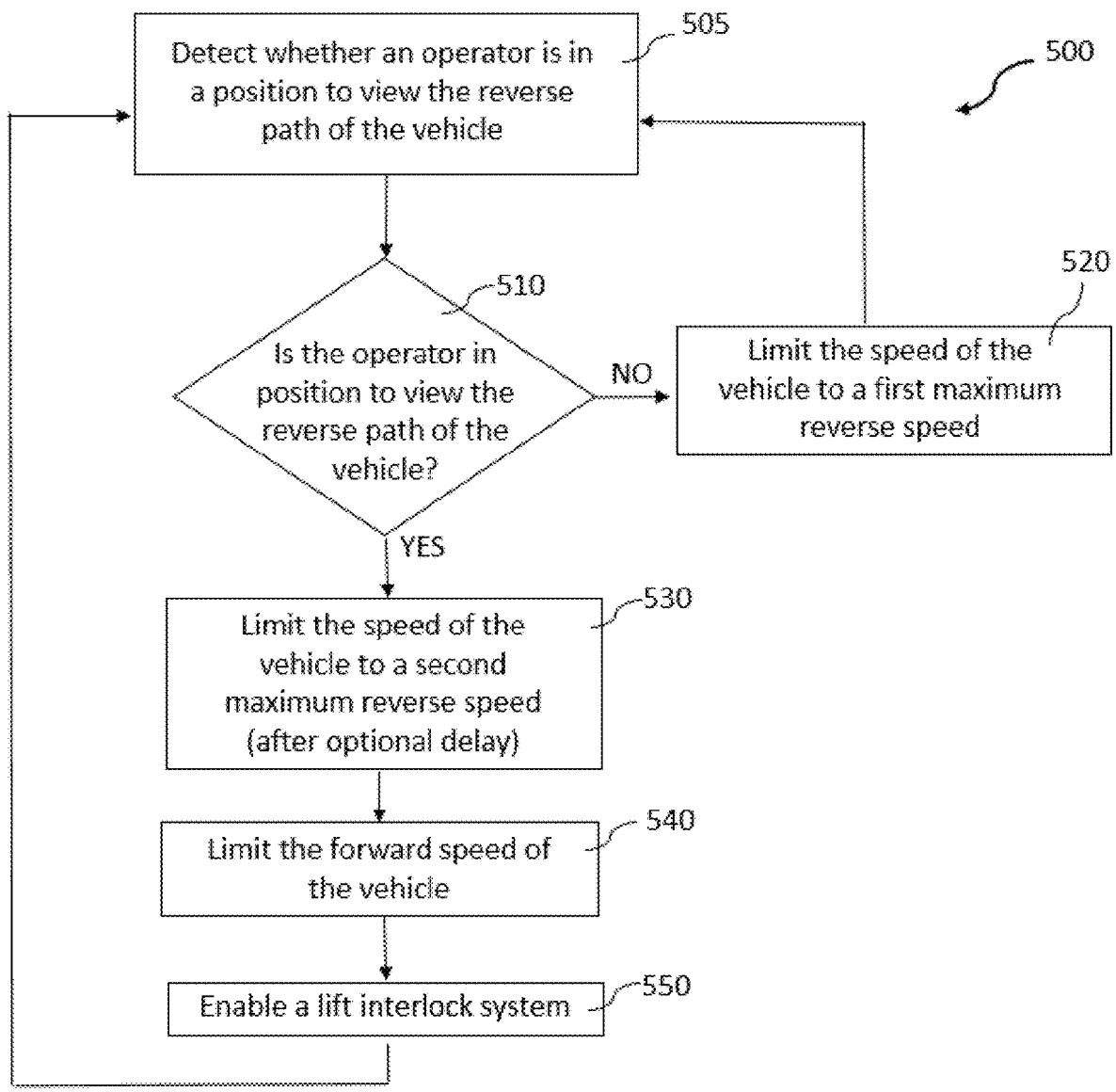
FIG. 11 illustrates an example method of operating a materials-handling vehicle equipped with a reverse-consent sensor.

Methods of controlling the reverse speed of the vehicle 100 can include multiple steps. In an embodiment illustrated in FIG. 11, a method 500 of controlling the reverse speed of the vehicle 100 includes step 505, detecting whether the operator can view the reverse path of the vehicle using one or more reverse-consent sensors 145 and a step 510, determining if the operator is in position to view the reverse path of the vehicle 100. If not, the method 500 proceeds to a step 520, limiting the speed of the vehicle 100 to a first maximum reverse speed suitable for an operator not in position to view the reverse path of the vehicle 100. If the step 510 determines that the operator is in an acceptable position to view the reverse path of the vehicle 100, then the method 500 proceeds to a step 530, limiting the speed of the vehicle 100 to a second maximum reverse speed suitable for an operator in a position to view the reverse path of the vehicle 100. The first maximum reverse speed may be less than the second maximum reverse speed.

Optionally, the step 530 can be enacted after a delay (e.g., 3-5 seconds). The method 500 can further include an optional step 540, limiting a forward speed of the vehicle 100, and/or optional step 550, enabling a lift interlock system (if present). The method 500 can include one or more optional steps, such as 540, 550 and a delay, in any order. That is, upon determination of the operator being in position to view the reverse path of the vehicle, step 530 can be enacted before, concurrently with, or subsequent to any of the optional steps (delay, 540, and/or 550). The limiting of the forward and/or reverse speed maxima can occur via the controller 150.

The controller 150 can communicate with the speed control system 152 as well as with any reverse-consent sensors 145, to allow the operator to access either a limited reverse speed or the full reverse speed range of the vehicle 100. The controller 150 may additionally be operably connected with the reverse-consent sensor 145 to allow for a delay before the data from the reverse-consent sensor 145 returns to the limit of the first maximum reverse speed after previously limiting the speed to a second maximum reverse speed. Such a delay may allow, for example, the operator to quickly wave a passing vehicle by the vehicle 100 using the hand that grasps handle 140 and then returning the hand to handle 140 to continue driving backward. In various embodiments, the delay may be about 3-5 seconds, about 2-6 seconds, about 3 seconds, about 4 seconds, or less than about 5 seconds.

The method 500 can further include an optional step 540 that limits the forward speed of the vehicle 100 if the vehicle 100 is placed into a forward gear, but the one or more reverse-consent sensors 145 indicate that the operator is in position to view the reverse path of the vehicle 100. The step 540 may reduce the maximum forward speed of the vehicle when the operator is detected to be in a position to view the reverse path of the vehicle and when the vehicle is placed into a forward gear for movement in the forward direction. The forward speed of the vehicle can be limited from a first maximum forward speed to a second maximum forward speed when the operator is detected to be in a position to view the path of the vehicle. In an embodiment, the second maximum forward speed may be lower than the first maximum forward speed.

The method 500 can further include an optional step 550 that enables a lift interlock system of the vehicle 100. The controller 150 may additionally be operably connected to a lift assembly control system 149, such as is present in a forklift truck, and may engage a lift interlock system when the reverse-consent sensor 145 is activated. In an embodiment, the materials-handling vehicle 100 is a forklift truck and the controller 150 is configured to engage a lift interlock system when the reverse-consent sensor 145 detects that the operator is in a position to view the reverse path of the vehicle. The vehicle 100 may include sensors in addition to the reverse-consent sensor 145, such as an operator-presence sensor, proximity sensor, and/or a forklift load sensor.

In an embodiment, the reverse-consent sensor 145 comprises the reverse-consent button 144. In another embodiment, the reverse-consent sensor 145 comprises the reverse consent squeeze lever 146. The reverse-consent sensor 145 may further comprise the handle 140 and/or the controller 150.

Embodiments of the materials-handling vehicles disclosed herein may include means for detecting whether the operator is in position to view the reverse path of the vehicle 100. Such means may be the reverse-consent sensor 145 in any of its various possible forms described above. For example, the means for detecting may be at least one of a camera, photocell, button, lever, pressure switch, or electrical impedance switch. Such means may be a sensor that is configured to sense whether a hand of the operator is grasping the grip portion of the handle, or a sensor that is configured to sense whether the head of an operator is turned toward the rear of the vehicle when the operator is sitting in the operator's seat.

Some embodiments may further include means for limiting the reverse speed of the vehicle to a first maximum reverse speed when the operator is not detected to be in a position to view the reverse path of the vehicle and to a second maximum reverse speed when the operator is detected to be in a position to view the reverse path of the vehicle, wherein the first maximum reverse speed of the vehicle is lower than the second maximum reverse speed of the vehicle. Such means for limiting the reverse speed may be the controller 150 described above alone or in combination with the speed control system 152 described above. Such means for limiting the reverse speed may be a processor, or it may be the VSM.

Some embodiments may further include a means for lifting a load. Such lifting means may comprise the lift carriage 102, the forks 104, the mast 106, the lift assembly control system 149, and associated hydraulics.

Some embodiments may further include a means for disabling the means for lifting a load when the operator is detected to be in a position to view the reverse path of the vehicle. Such disabling means may be the controller 150 described above alone or in combination with the lift assembly control system 149 described above. Such disabling means may be a processor, or it may be the VSM.

One will appreciate that some aspects of the reverse-consent sensor as depicted for the forklift trucks described herein can also be utilized for other materials-handling vehicles, for example, towing tugs, end-rider trucks, and big trucks.

CONCLUSION

The terms and descriptions used above are set forth by way of illustration and example only and are not meant as limitations. Those skilled in the art will recognize that many variations, enhancements and modifications of the concepts described herein are possible without departing from the underlying principles of the invention. For example, skilled persons will appreciate that the subject matter of any sentence or paragraph can be combined with subject matter of some or all of the other sentences or paragraphs, except where such combinations are mutually exclusive. The scope of the invention should therefore be determined only by the following claims, claims presented in a continuation patent application, and equivalents to the following and any foregoing claims.

The invention claimed is:

1. A method for controlling a reverse speed of a materials-handling vehicle having a forward-facing operator seat, a front end, a back end, a controller, a mast, at least two forks connected to the mast, a substantially horizontal panel behind the operator seat, and a reverse-consent sensor in the form of a handle grippable by a hand of the operator, wherein the reverse-consent sensor is located on the substantially horizontal panel behind the operator seat, the method comprising:
   detecting, via the reverse-consent sensor, whether an operator of the vehicle is in a position to view a reverse path of the vehicle when the vehicle is driven in a reverse direction;
   in response to not detecting the operator, via the reverse-consent sensor, to be in a position to view the reverse path of the vehicle when the vehicle is driven in a reverse direction, limiting, via the controller, the reverse speed of the vehicle to a first maximum reverse speed; and
   in response to detecting the operator, via the reverse-consent sensor, to be in a position to view the reverse path of the vehicle when the vehicle is driven in a reverse direction performing the following steps:
      limiting, via the controller, the reverse speed of the vehicle to a second maximum reverse speed, wherein the first maximum reverse speed of the vehicle is lower than the second maximum reverse speed of the vehicle;
      limiting, via the controller, a forward speed of the vehicle to a maximum forward speed less than the vehicle is otherwise able to achieve in the forward direction; and
      locking, via the controller, the mast in place.

2. The method of claim 1, wherein the reverse-consent sensor comprises at least one of a photocell, button, lever, pressure switch, or electrical impedance switch.

3. The method of claim 1, wherein the second maximum reverse speed is a top reverse speed, which is less than a top forward speed.

4. A materials-handling vehicle comprising:
   a vehicle having a front end and a back end;
   a plurality of wheels connected to the vehicle;
   a throttle;
   a forward-facing operator seat connected to the vehicle;
   a substantially horizontal panel behind the operator seat;
   a reverse-consent sensor configured to sense the presence of a hand on the reverse-consent sensor, wherein the reverse-consent sensor comprises a handle, and wherein the reverse-consent sensor is attached to the vehicle and located on the substantially horizontal panel behind the operator seat such that the handle is grabbable by a hand of an operator of the vehicle while the operator is seated in the operator seat and such that the presence of a hand of the operator on the handle is indicative that the operator of the vehicle is in a position to view a reverse path of the vehicle;
   a controller operably connected to the reverse-consent sensor and the throttle;
   a mast;
   at least two forks connected to the mast; and
   a lift interlock system, operably connected to the mast, configured to lock the mast in place when the lift interlock system is engaged;
   wherein the controller is configured to limit the materials-handling vehicle to a first maximum reverse speed if the reverse-consent sensor does not detect that the operator is in a position to view a reverse path of the vehicle,
   wherein the controller is configured to limit the materials-handling vehicle to a second maximum reverse speed if the reverse-consent sensor detects that the operator is in a position to view the reverse path of the vehicle, wherein the first maximum reverse speed is lower than the second maximum reverse speed,
   wherein the controller is additionally configured to engage the lift interlock system if the reverse-consent sensor detects the operator is in a position to view the reverse path of the vehicle, and
   wherein the controller is additionally configured to limit a forward speed of the vehicle to a maximum forward speed less than the vehicle is otherwise able to achieve in the forward direction if the reverse-consent sensor detects the operator is in a position to view the reverse path of the vehicle.

5. The materials-handling vehicle of claim 4, wherein the reverse-consent sensor comprises at least one of a photocell, button, lever, pressure switch, or electrical impedance switch.

6. The materials-handling vehicle of claim 4, wherein:
   the reverse-consent sensor comprises a button on a handle having a grip portion, and
   detecting, by the reverse-consent sensor, that the operator is in a position to view the reverse path of the vehicle comprises detecting activation of the button.

7. A materials-handling vehicle having a forward-facing operator seat, a front end, a back end, and, the materials-handling vehicle comprising:
- means for detecting presence of a hand of the operator of the vehicle is in a position indicative that the operator's body is in a position to view a reverse path of the vehicle;
- means for limiting, after a delay of about 2-6 seconds, the reverse speed of the vehicle to a first maximum reverse speed when the operator is not detected to be in a position to view the reverse path of the vehicle and to a second maximum reverse speed when the operator is detected to be in a position to view the reverse path of the vehicle, wherein the first maximum reverse speed of the vehicle is lower than the second maximum reverse speed of the vehicle;
- means for lifting a load;
- means for disabling the means for lifting a load when the operator is detected to be in a position to view the reverse path of the vehicle, and
- means for limiting a forward speed of the vehicle when the operator is detected to be in a position to view the reverse path of the vehicle.

8. The materials-handling vehicle of claim 4, wherein the throttle determines the reverse speed of the vehicle between zero and the first maximum reverse speed when the reverse-consent sensor does not detect that the operator is in a position to view the reverse path of the vehicle.

9. The materials-handling vehicle of claim 8, wherein the throttle is a hand control on the forward-facing operator seat.

10. The materials-handling vehicle of claim 4, wherein the reverse-consent sensor does not include the throttle.

11. The materials-handling vehicle of claim 4, wherein said reverse-consent sensor is a right-hand reverse-consent sensor located on the vehicle so as to be grabbable by the right hand of the operator when the operator is in a position to view the reverse path of the vehicle, the vehicle further comprising:
- a left-hand reverse consent sensor located on the vehicle so as to be grabbable by the left hand of the operator when the operator is in a position to view to view the reverse path of the vehicle, wherein controller is configured to respond to left-hand reverse-consent sensor in the same way as the right-hand reverse-consent sensor.

12. The materials-handling vehicle of claim 11, wherein the right-hand reverse-consent sensor and the left-hand reverse consent sensor are symmetrical about a longitudinal center line of the vehicle.

13. The materials-handling vehicle of claim 4, wherein the reverse-consent sensor is located on the vehicle at an angle of approximately 120 degrees relative to the forward axis of the vehicle.

14. The materials-handling vehicle of claim 4, wherein the reverse-consent sensor is located on the vehicle from approximately 3.5 inches to approximately 5 inches from the operator seat.

15. The materials-handling vehicle of claim 4, wherein the reverse-consent sensor is an elongate member having an axis along its length, and wherein the reverse-consent actuator is located on the vehicle such that its axis is at an angle of approximately 45 degrees relative to a forward axis of the vehicle.

16. The materials-handling vehicle of claim 4, further comprising an enclosed operator cabin, wherein the handle is located within the enclosed operator cabin.

17. The materials-handling vehicle of claim 4, wherein the controller is additionally configured to include a delay before changing the second maximum reverse speed of the materials-handling vehicle to the first maximum reverse speed when the reverse-consent sensor detects that an operator is in a position to view the reverse path of the vehicle.

18. The materials-handling vehicle of claim 17, wherein the delay is selected from the group consisting of about 2-6 seconds, about 3-5 seconds, about 3 seconds, about 4 seconds, and less than about 5 seconds.

19. The method of claim 1, further comprising:
- interposing a delay between a time when the reverse-consent sensor detects that an operator is in a position to view the reverse path of the vehicle and a time when said limiting the reverse speed of the vehicle to a second maximum reverse speed commences.

20. The method of claim 19, wherein the delay is selected from the group consisting of about 2-6 seconds, about 3-5 seconds, about 3 seconds, about 4 seconds, and less than about 5 seconds.

* * * * *